United States Patent
Morello et al.

(10) Patent No.: US 10,723,173 B2
(45) Date of Patent: Jul. 28, 2020

(54) COUPLING SYSTEM FOR A LOW-FRICTION SEALING ASSEMBLY, AND WHEEL HUB UNIT EQUIPPED WITH SAID SEALING ASSEMBLY

(71) Applicant: Aktiebolaget SKF, Gothenburg (SE)

(72) Inventors: Fausto Morello, Sommariva del Bosco (IT); Daniele Duch, San Gillio (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/824,007

(22) Filed: Nov. 28, 2017

(65) Prior Publication Data

US 2018/0147886 A1 May 31, 2018

(30) Foreign Application Priority Data

Nov. 28, 2016 (IT) .......................... 102016000120099

(51) Int. Cl.

| | |
|---|---|
| *B60B 27/00* | (2006.01) |
| *F16J 15/3268* | (2016.01) |
| *F16C 33/78* | (2006.01) |
| *F16C 19/18* | (2006.01) |

(Continued)

(52) U.S. Cl.
CPC ........ *B60B 27/0073* (2013.01); *F16C 19/181* (2013.01); *F16C 33/783* (2013.01); *F16C 33/7883* (2013.01); *F16C 33/805* (2013.01); *F16J 15/3256* (2013.01);

(Continued)

(58) Field of Classification Search
CPC ................ F16C 33/783; F16C 33/7883; F16C 33/7889; F16C 33/805; B60B 27/0073
See application file for complete search history.

(56) References Cited

U.S. PATENT DOCUMENTS

| | | |
|---|---|---|
| 2008/0199120 A1 | 8/2008 | Torii |
| 2010/0129018 A1 | 5/2010 | Shigeoka |
| 2012/0177315 A1 | 7/2012 | Matsuki |

(Continued)

FOREIGN PATENT DOCUMENTS

| | | |
|---|---|---|
| CN | 101449073 A | 6/2009 |
| DE | 102011088861 A1 | 6/2013 |

(Continued)

*Primary Examiner* — James Pilkington
(74) *Attorney, Agent, or Firm* — Garcia-Zamor Intellectual Property Law, LLC; Ruy Garcia-Zamor; Bryan Peckjian

(57) ABSTRACT

A coupling system for a sealing assembly with a rotating annular member. In particular, a bearing ring provided with a flange. The sealing assembly provides at least one first annular shield having a sleeve portion integrally coupled with the rotating annular member and a flange portion that radially and overhangingly protrudes from the sleeve portion and is arranged close to the flange. The sleeve portion is defined by a solid tubular body of rotation delimited by a mounting surface facing towards the rotating annular member and having cylindrical geometry, In combination, the sleeve portion couples with an assembly seat of the rotating annular member, formed by an annular shallow recess delimited by a cylindrical bottom surface and by an axial shoulder arranged on the side opposite to the flange; the first annular shield being placed, at the same time, in axial contact with the flange portion and the axial shoulder.

19 Claims, 2 Drawing Sheets

(51) Int. Cl.
*F16J 15/3256* (2016.01)
*F16C 33/80* (2006.01)

(52) U.S. Cl.
CPC ....... *F16J 15/3268* (2013.01); *B60B 27/0005* (2013.01); *F16C 19/184* (2013.01); *F16C 2326/02* (2013.01)

(56) References Cited

U.S. PATENT DOCUMENTS

| | | | |
|---|---|---|---|
| 2015/0003766 A1* | 1/2015 | Duch | F16C 33/805 |
| | | | 384/480 |
| 2015/0151574 A1* | 6/2015 | Barberis | F16C 33/783 |
| | | | 384/486 |
| 2016/0347120 A1* | 12/2016 | Barberis | F16C 33/7883 |

FOREIGN PATENT DOCUMENTS

| | | | |
|---|---|---|---|
| EP | 1902863 A2 | 3/2008 | |
| EP | 2837507 A1 | 2/2015 | |
| EP | 2878842 A1 | 6/2015 | |
| JP | 2014240679 | * | 12/2014 |
| JP | 2014240679 A | 12/2014 | |

* cited by examiner

COUPLING SYSTEM FOR A LOW-FRICTION SEALING ASSEMBLY, AND WHEEL HUB UNIT EQUIPPED WITH SAID SEALING ASSEMBLY

CROSS-REFERENCE

This application claims priority to Italian patent application no. 102016000120099 filed on Nov. 28, 2016, the contents of which are fully incorporated herein by reference.

TECHNOLOGICAL FIELD

The present invention relates to a system for coupling a sealing assembly to a wheel hub unit and relates, furthermore, to a wheel hub unit equipped with said coupling system.

BACKGROUND

Wheel hub units of known type comprise, in general, a stationary outer ring, a flanged inner hub, rotating in use and provided with a flange to support, in use, a vehicle wheel, and are equipped with coupling systems for coupling sealing assemblies to the wheel hub unit, wherein the sealing assemblies are made up of so-called "cassette" seals including a first and a second annular shield mounted facing each other, respectively, on the outer ring and on an interference-fit surface of the flanged hub to delimit from each other an annular chamber within which are arranged a series of sealing lips carried by an annular seal integrally fixed to one of the shields, generally the shield intended in use to remain stationary.

It has, however, been found that the shield mounted on the flanged hub, placed, therefore, close to the wheel support flange, tends, in use, to move axially with respect to the flanged hub itself, because of the deflection of the flange, i.e. because of the deformations to which the flange is subjected by the wheel as the vehicle goes round bends.

This disadvantage on the one hand increases the friction affecting the sealing assembly, since the sealing lips which are not scraping (and therefore not generating friction) can become scraping (and therefore generate friction) and any sealing lips which are scraping increase their interference and, therefore the friction generated. On the other hand, in the case of relatively large movements, it can cause interference between the rotating shield and the stationary outer ring, with very high friction being generated and with possible damage to the sealing assembly, and even, in the most serious cases, to the wheel hub assembly itself.

SUMMARY

The object of the present invention is to provide a system for coupling a sealing assembly to a wheel hub unit which is free of the disadvantage described, having furthermore low costs and high ease of manufacture, high efficiency in protecting the revolving bodies, small dimensions, both axial and radial, and low friction.

On the basis of the invention there is therefore provided a system for coupling a sealing assembly to a wheel hub unit having the characteristics stated in the attached claims.

A wheel hub unit is also provided.

BRIEF DESCRIPTION OF THE DRAWINGS

The invention will now be described by reference to the attached drawings, which illustrate a non-limiting example of embodiment, in which.

DETAILED DESCRIPTION

Figure 1:
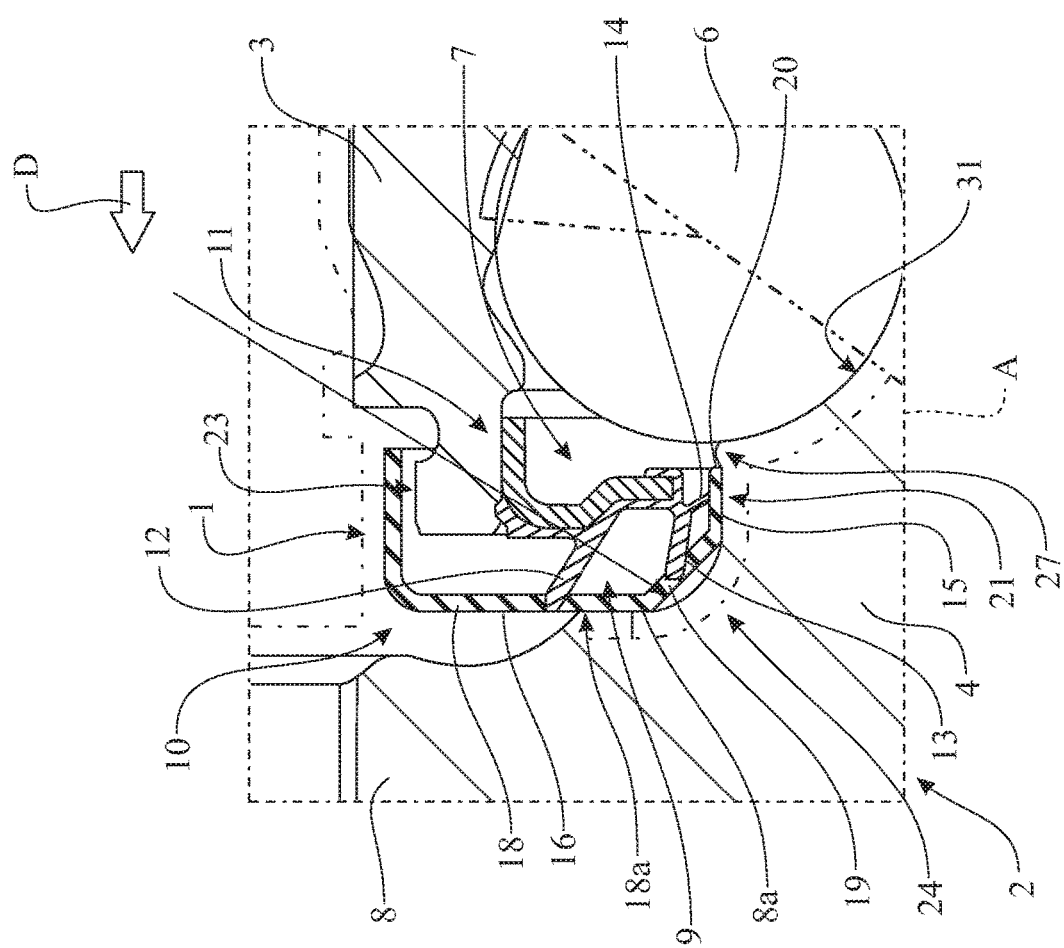
FIG. 1 illustrates, schematically and in radial section, a longitudinal view in elevation, with parts removed for simplicity, of a wheel hub unit made according to the invention and incorporating a coupling system according to the invention.

With reference to FIG. 1, no. 1 indicates a low-friction sealing assembly designed to be mounted on a wheel hub unit 2 of a vehicle, of which the sealing assembly 1 comes in use to form an integral part.

The wheel hub unit 2 comprises an outer ring 3, stationary in use, an inner ring 4, rotating in use around an axis A, which is also the axis of symmetry of both rings 3 and 4 and of the sealing assembly 1, and at least one crown of rolling bodies 6 interposed between the outer ring 3 and the inner ring 4, which are coaxial with each other; the inner ring 4 is equipped with a flange 8 on the side opposite to the outer ring 3 and intended in use to carry a vehicle wheel.

The sealing assembly 1 is insertable into an annular space 7 delimited between the inner rotating ring 4 and the outer ring 3 and, more generally, between the rotating element 4 and the stationary element 3, coaxial with each other, of a generic rolling bearing of any known type, forming part of, or integrated with, the wheel hub unit 2.

The sealing assembly 1 is interposed between rings 3 and 4, being inserted into the annular space 7, to protect the rolling bodies 6 arranged between the stationary element 3 and the rotating element 4, and includes a first annular shield 10 formed from a metal sheet, preferably of stainless steel, by shearing and stamping, a second annular shield 11, also formed from a metal sheet, preferably of stainless steel, by shearing and stamping, arranged facing shield 10, and an annular seal 9 made of one or more elastomeric materials, carried integrally by shield 11 and equipped with a plurality of sealing lips 12, 13, 14 which cooperate with shield 10 to provide a fluid-proof seal to the annular space 7 towards the rolling bodies 6.

Shield 10 is provided with a sleeve portion 15 defined by a tubular rotation solid, integral in use with the rotating element 4, and with a flange portion 16, which extends radially and overhangingly from the sleeve portion 15, illustrated in the non-limiting example on the side opposite to axis A, therefore radially towards the outside. The flange portion 16 comprises, in its turn, an annular portion 18 arranged axially close to a surface 8a of flange 8, and a conical portion 19 interposed between annular portion 18 and sleeve portion 15. In the particular case, the flange portion 16, or, better, the annular portion 18 extends in a radial direction outside the annular space 7, radially and overhangingly with respect to a radially outer lateral surface 23 of ring 3, ring 3 as a result therefore facing the radially outer part of the flange portion 16. Furthermore, the annular portion 18 is axially delimited by a surface 18a transverse to axis A and arranged in contact with surface 8a.

Figure 2:
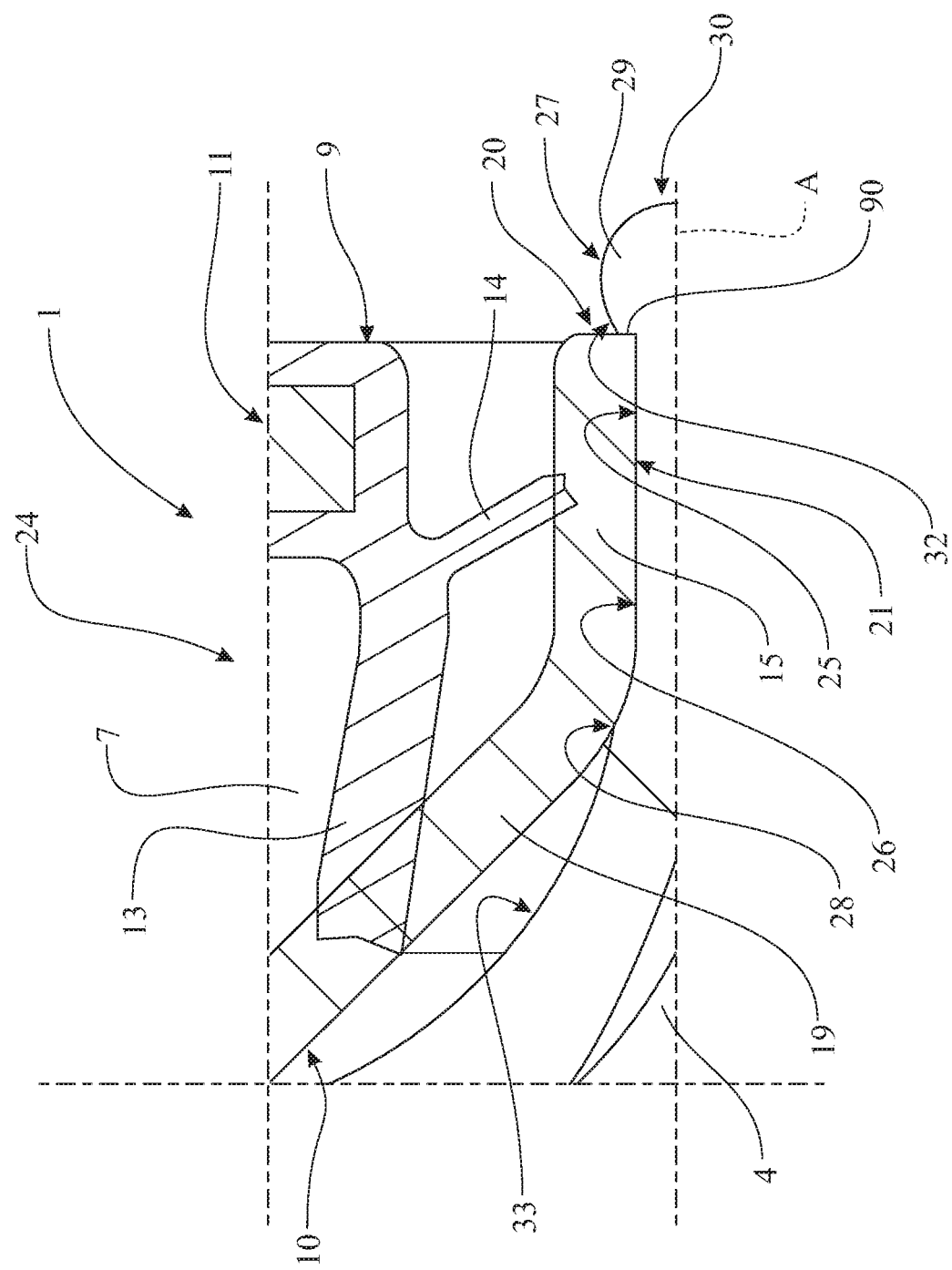
FIG. 2 illustrates, schematically in radial section, a detail of the coupling system of FIG. 1.

According to an aspect of the invention, as also illustrated in FIG. 2, with the object of avoiding the possibility, in use, of shield 10 moving towards ring 3 and the relative shield 11, the sealing assembly 1 according to the invention comprises at least one shield, in the particular case shield 10, which has its sleeve portion 15 axially delimited towards the crown of rolling bodies 6 by an annular surface 20 transverse to axis A, and delimited towards the inner ring 4 by a lateral mounting surface 21 facing towards the rotating element defined by ring 4 having cylindrical geometry with a diameter ϕm of constant size along axis A.

According to a further aspect of the invention, at least shield 10 is made of stamped and sheared metal sheet, so that sleeve portion 15 is elastically deformable.

By means of the innovative shape that is imparted to sleeve portion 15, a complete coupling system is created according to the invention for a generic sealing assembly, in the particular case for shield 10 of sealing assembly 1, with a rotating annular element, in the particular case with the inner bearing ring 4, the system illustrated in its entirety by 24.

The coupling system 24 comprises the first annular shield 10 of sealing assembly 1 and in particular the sleeve portion 15 intended in use to be coupled integrally with the rotating annular element 4, in an assembly seat of the latter, and the assembly seat itself, where the sleeve portion 15 is delimited by the lateral mounting surface 21 towards the annular rotating element 4 having a constant diameter ϕm; and where the assembly seat for shield 10 onto the rotating annular element 4 is made up of a shallow cylindrical recess 25 (FIG. 2) radially delimited by a cylindrical bottom surface 26 radially facing outwards and having a constant outer diameter ϕb. The shallow cylindrical recess 25 is axially limited, on the side of flange 8, by a toroidal connecting surface 33 between surface 8a and the bottom surface 26, and, on the side of the crown of rolling bodies 6, by an axial shoulder 27. The generic sealing assembly 24 is arranged having the at least one annular sealing lip 14 extending in a generally radially direction from the second annular shield 11, wherein the at least one annular sealing lip 14 cooperates with the sleeve portion 15 on a side opposite the side that contacts the bottom surface 26 of the annular recess 25.

In particular, the assembly seat defined by the shallow recess 25 is formed on a cylindrical lateral press-fit surface 28 of the rotating element, i.e. of the inner ring 4 in the example illustrated, normally intended in use to receive shield 10.

It should be noted that, for the purposes of improving the axial locking of shield 10 onto the press-fit surface 28 of the flanged inner ring 4, the adoption, instead, of a cylindrical interference-fit portion 15 in combination with an assembly seat, itself having a cylindrical press-fit surface like surface 26, as will be seen, axially delimited, on the side opposite the insertion direction D, in use, of shield 10 onto annular element 4, indicated by the arrow in FIG. 1, from annular shoulder 27, surprisingly renders the mounting of shield 10 definitively stable.

Thus, the complete coupling or interference-fit system 24 according to the invention comprises the first sleeve portion 15 of the first shield 10, which defines an interference-fit portion for shield 10 onto annular element 4 as a tubular rotation solid with a cylindrical shape; and the bottom surface 26 of the shallow annular recess 25.

Furthermore, axial shoulder 27, which, according to a further aspect of the invention, is defined by an annular relief or bulge 29 which delimits the shallow recess 25 towards a free frontal rim 30 of rotating annular element 4, also forms part of the complete coupling or keying system 24 according to the invention; in the particular case illustrated, in which this rotating annular element is defined by the inner ring 4 of a wheel hub unit 2, the free frontal rim 30 delimits a rolling track 31 for the rolling bodies 6 arranged on the side of flange 8.

The annular relief or bulge 29 of the rotating annular element has in radial section (FIG. 2) a rounded profile limited towards the shallow recess 25 by a sloping surface 32 which engages in the cylindrical bottom surface at a mounting point 90, so that the free cylindrical end 20 of the sleeve portion 15 engages by snap fit close to the sloping surface 32 itself and so that an axial distance of the mounting point 90 from surface 8a has a length in an axial direction identical to the extension in length, in an axial direction, of the annular shield 10, in particular of the distance in an axial direction between surface 18a and surface 20.

The diameter of the cylindrical lateral surface 28 of the rotating annular element or inner ring 4 is, according to the invention, substantially equal to, or slightly less than, an outer diameter ϕr of the annular relief or bulge 29 at a maximum radial height thereof; in combination, the diameter ϕm of the lateral mounting surface 21 towards the rotating annular element 4 of the sleeve-type interference-fit portion 15 is such as to form an interference coupling, forced or lightly forced, between the sleeve-type interference-fit portion 15 and the interference-fit seat defined by the annular relief or bulge 29 and the shallow recess 25, so that this coupling, forced or lightly forced, begins, starting right from the first coupling of the sleeve-type interference-fit portion 15 with the annular relief or bulge 29, and is kept substantially constant as the sleeve-type interference-fit portion 15 is inserted in direction D along the shallow recess 25, stabilizing itself at the moment when, simultaneously or substantially simultaneously, surface 18a comes into contact with surface 8a and end 22 is coupled by snap fit into the shallow recess 25, after having "jumped" the annular relief or bulge 29 and, in particular, after being carried next to mounting point 90, i.e. beyond surface 32 which constitutes the "gentle slope" of the rounded profile of the annular relief or bulge 29 and which forms axial shoulder 27.

In this way, once the sleeve-type interference-fit portion 15 is fully inserted inside the assembly seat formed by the shallow cylindrical recess 25, and the lateral mounting surface 21 is arranged in direct contact, with interference, on the bottom surface 26, shield 10 is axially locked both in direction D, and in the direction opposite to direction D, and its axial position is assured and immutable, including in use, both with respect to both of rings 3 and 4, and, especially, with respect to the annular seal 9 integral with shield 11, the relative position of the sealing lips 12, 13, 14 will not be changed even following any deflection of the flange, i.e. the deformations to which the flange is subjected by the wheel while the vehicle is going round bends.

According to the invention, thanks to the coupling system 24 a wheel hub unit 2 is obtained like the one described above, wherein shield 10 has a cylindrical interference-fit sleeve-shaped portion 15, easily achievable in production and having sufficient elasticity to "jump", at the assembly stage, the annular relief or bulge 29, and to return elastically to being coupled with the cylindrical surface 28 of the inner ring 4, which is comprised between flange 8 and track 31 adjacent thereto, and, furthermore, preferably in combination with this characteristic, the inner ring 4 has, between flange 8 and a free front rim 30 thereof delimiting the rolling track 31 for the rolling bodies 6, a cylindrical lateral surface 28 provided with an assembly seat for the sleeve-type interference-fit portion 15 of the first shield 10, this assembly seat being defined by a shallow annular recess 25 delimited by a cylindrical bottom surface 26 and by an axial shoulder 27 arranged on the side opposite to the first flange portion 16 and defining a determinate axial space for mounting shield 10, inside which shield 10 itself, once assembled, will no longer be able to move.

It is to be understood that the invention is not limited to the embodiments here described and illustrated, which are to be considered as examples of implementation of the low-friction sealing assembly, which are, however, capable of further modification relating to forms and arrangement of parts, construction details and assembly.

What is claimed is:

1. A coupling system of a sealing assembly with a rotating annular member, the rotating annular member being a ring of a rolling bearing provided with a flange, the sealing assembly comprises:
   at least one first annular shield having a sleeve portion extending axially from a radially inner edge of a conical portion and a flange portion extending radially from a radially outer edge of the conical portion and overhangingly protrudes over the sleeve portion, the sleeve portion coupled integrally with the rotating annular member; and
   wherein the sleeve portion of the first annular shield is defined by a solid tubular body delimited by a mounting surface facing towards the rotating annular member and having cylindrical geometry,
   wherein, in combination, the sleeve portion couples with an assembly seat of the rotating annular member formed by an annular recess delimited by a bottom surface axially limited by a toroidal connecting surface on a side of the flange and an axial shoulder arranged on a side opposite to the flange, wherein the annular recess has a length that is identical to a length between the free cylindrical end of the sleeve portion and a transition between the sleeve portion and the conical portion,
   wherein the first annular shield is positioned, at the same time, in axial contact with the flange and a free cylindrical end of the sleeve portion abutting the axial shoulder.

2. The coupling system according to claim 1, wherein the axial shoulder defines a mounting point located at one end of the bottom surface of the annular recess, wherein an axial distance of the mounting point from an abutting surface of the flange has a length in an axial direction identical to an extension in length, in the axial direction, of the first annular shield, where the axial shoulder and annular recess meet the mounting point is defined.

3. The coupling system according to claim 2, wherein the axial shoulder is defined by an annular relief that delimits the annular recess towards a frontal free rim of the rotating annular member,
   wherein the annular relief of the rotating annular member has a rounded profile in radial section defined towards the annular recess by a sloping surface that joins the bottom surface at the mounting point so that the free cylindrical end of the sleeve portion is snapped against the sloping surface.

4. The coupling system according to claim 3, wherein a diameter of a lateral mounting surface of the sleeve portion is of a size and shape that creates an interference fit between the sleeve portion and the bottom surface of the annular recess.

5. The coupling system according to claim 1, wherein the bottom surface terminates at an initiation of a sloping surface of the axial shoulder.

6. The coupling system according to claim 1, further comprising at least one annular sealing lip extending in a generally radially direction from a second annular shield, wherein the at least one annular sealing lip cooperates with the sleeve portion on a side opposite the side that contacts the bottom surface of the annular recess.

7. The coupling system according to claim 1, further comprising a sloping surface interposed between the axial shoulder and the mounting surface, the sloping surface extending in a direction that is radially outward and axially away from the bottom surface of the annular recess.

8. The coupling system according to claim 1, wherein the axial shoulder is defined by an annular relief that delimits the annular recess towards a free front rim of the rotating annular member, and further comprising a mounting surface extending radially between the axial shoulder and the bottom surface of the annular recess.

9. A wheel hub bearing unit comprising:
   an outer stationary ring,
   an inner rotating ring, having an end provided with a flange on a side opposite to the outer ring,
   at least one crown of rolling bodies interposed between the outer ring and the inner ring, and a sealing assembly having at least one first shield provided with a sleeve portion extending axially from a radially inner edge of a conical portion and a flange portion extending radially from a radially outer edge of the conical portion and overhangingly protrudes over the sleeve portion, the sleeve portion coupled integrally with the inner ring, and
   the first shield being mounted radially interposed between the outer ring and the inner ring so that the flange portion is arranged axially interposed in an annular space between the flange and the outer ring;
   wherein the sleeve portion of the first annular shield is defined by a solid tubular body delimited by a mounting surface facing towards the inner ring and having cylindrical geometry
   wherein the inner ring includes a lateral cylindrical surface located between the flange and a free front rim,
   wherein the lateral cylindrical surface is provided with an assembly seat for the sleeve portion of the first shield,
   wherein the assembly seat is defined by an annular recess delimited by a cylindrical bottom surface axially limited by a toroidal connecting surface on a side of the flange and an axial shoulder arranged on a side opposite to the flange portion, wherein the annular recess has a length that is identical to a length between the free cylindrical end of the sleeve portion and a transition between the sleeve portion and the conical portion,
   wherein the first annular shield is placed in axial contact with the flange and a free cylindrical end of the sleeve portion of the first annular shield is placed abutting the axial shoulder,
   wherein the free front rim delimits a rolling track for the rolling bodies.

10. The wheel hub bearing unit according to claim 9, wherein the bottom surface terminates at an initiation of a sloping surface of the axial shoulder.

11. The wheel hub bearing unit according to claim 9, further comprising at least one annular sealing lip extending in a generally radially direction from a second annular shield, wherein the at least one annular sealing lip cooperates with the sleeve portion on a side opposite the side that contacts the bottom surface of the annular recess.

12. The wheel hub bearing unit according to claim 9, further comprising a sloping surface interposed between the axial shoulder and the mounting surface, the sloping surface extending in a direction that is radially outward and axially away from the bottom surface of the annular recess.

13. The wheel hub bearing unit according to claim 9, wherein the axial shoulder is defined by an annular relief that delimits the annular recess towards the free front rim of the rotating annular member, and further comprising a mounting surface extending radially between the axial shoulder and the bottom surface of the annular recess.

14. A coupling system of a sealing assembly with a rotating annular member, the rotating annular member being a ring of a rolling bearing provided with a flange, the sealing assembly comprises:
- at least one first annular shield having a sleeve portion coupled integrally with the rotating annular member; and
- a flange portion that radially and overhangingly protrudes from the sleeve portion,
- wherein the sleeve portion of the first annular shield is defined by a solid tubular body delimited by a mounting surface facing towards the rotating annular member and having cylindrical geometry,
- wherein, in combination, the sleeve portion couples with an assembly seat of the rotating annular member formed by an annular recess delimited by a bottom surface axially limited by a toroidal connecting surface on a side of the flange and an axial shoulder arranged on a side opposite to the flange,
- wherein the first annular shield is positioned, at the same time, in axial contact with the flange and a free cylindrical end of the sleeve portion abutting the axial shoulder,
- wherein the axial shoulder defines a mounting point located at one end of the bottom surface of the annular recess, wherein an axial distance of the mounting point from an abutting surface of the flange has a length in an axial direction identical to an extension in length, in the axial direction, of the first annular shield, where the axial shoulder and annular recess meet the mounting point is defined,
- wherein the axial shoulder is defined by an annular relief that delimits the annular recess towards a frontal free rim of the rotating annular member,
- wherein the annular relief of the rotating annular member has a rounded profile in radial section defined towards the annular recess by a sloping surface that joins the bottom surface at the mounting point so that the free cylindrical end of the sleeve portion is snapped against the sloping surface.

15. The coupling system according to claim 14, wherein a diameter of a lateral mounting surface of the sleeve portion is of a size and shape that creates an interference fit between the sleeve portion and the bottom surface of the annular recess.

16. The coupling system according to claim 14, wherein the bottom surface terminates at an initiation of a sloping surface of the axial shoulder.

17. The coupling system according to claim 14, further comprising at least one annular sealing lip extending in a generally radially direction from a second annular shield, wherein the at least one annular sealing lip cooperates with the sleeve portion on a side opposite the side that contacts the bottom surface of the annular recess.

18. The coupling system according to claim 14, further comprising a sloping surface interposed between the axial shoulder and the mounting surface, the sloping surface extending in a direction that is radially outward and axially away from the bottom surface of the annular recess.

19. The coupling system according to claim 14, wherein the axial shoulder is defined by an annular relief that delimits the annular recess towards the free front rim of the rotating annular member, further comprising a mounting surface extending radially between the mounting point and the axial shoulder.

* * * * *